Oct. 23, 1962   R. R. BEGGS   3,059,713
SELF-PROPELLED GOLF BAG CART
Filed June 16, 1961   3 Sheets-Sheet 1

INVENTOR.
ROBERT R. BEGGS
BY
Fishburn and Gold
ATTORNEYS

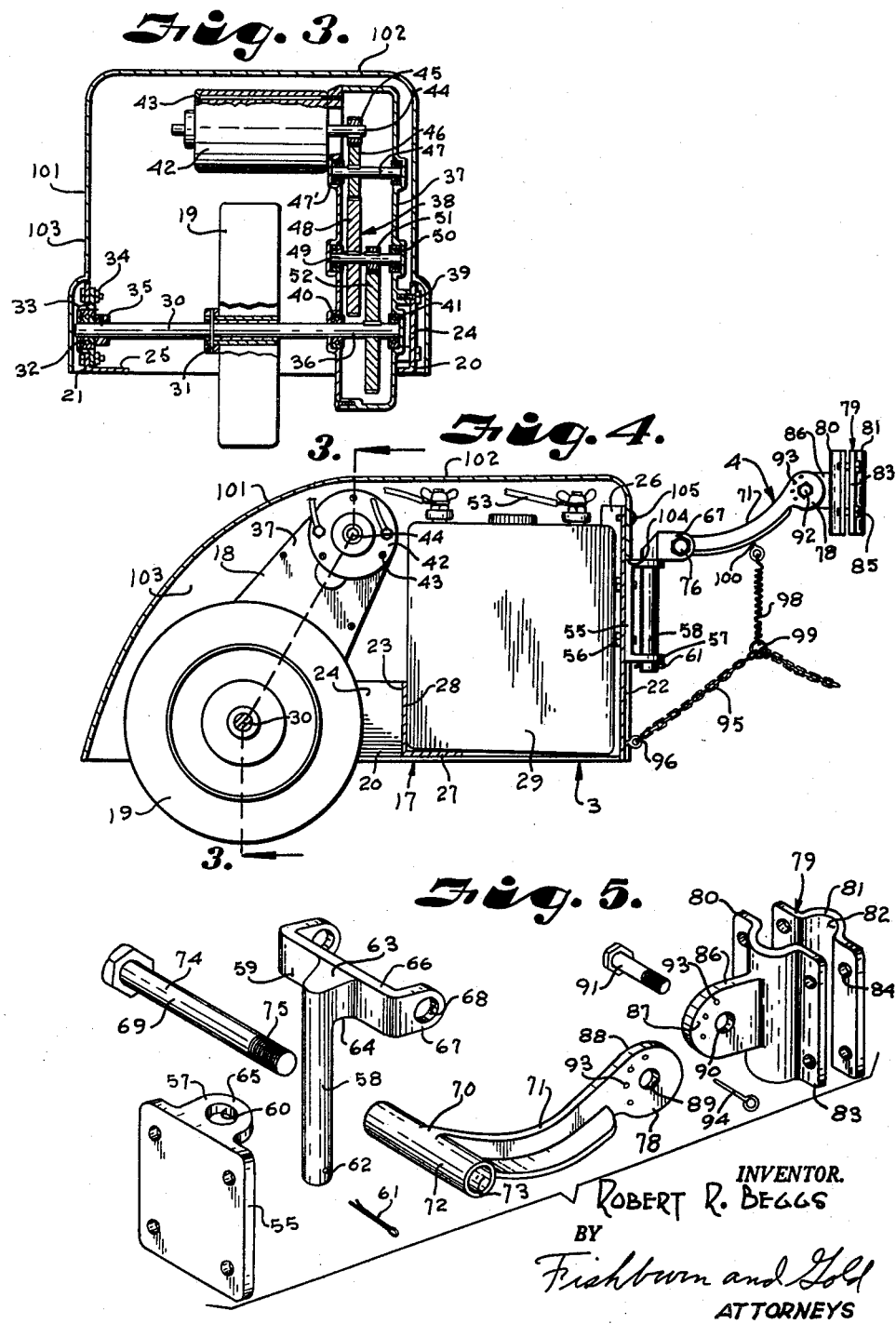

Oct. 23, 1962

R. R. BEGGS 3,059,713

SELF-PROPELLED GOLF BAG CART

Filed June 16, 1961

INVENTOR.
ROBERT R BEGGS
BY
Fishburn and Gold
ATTORNEYS

United States Patent Office 3,059,713
Patented Oct. 23, 1962

3,059,713
SELF-PROPELLED GOLF BAG CART
Robert R. Beggs, 533 N. Santa Fe, Salina, Kans.
Filed June 16, 1961, Ser. No. 117,549
8 Claims. (Cl. 180—13)

This invention relates to self-propelled wheeled structures adapted to carry loads, and more particularly to a self-propelled load-carrying structure such as a golf bag cart for transporting golf equipment under control of the golfer as he walks from place to place on the course.

This invention contemplates a self-propelled wheeled structure having a load-carrying section and a follower traction section pivotally connected together whereby the traction wheel on the follower section has a caster action behind the load-carrying section which is carried on two or more ground-engaging wheels. The invention further contemplates such a structure wherein the self-propelling unit is a follower section adapted to be connected to a two-wheel golf bag cart having an upstanding post at the back and a pair of transversely spaced supporting wheels about which the post will rock and a handle secured to said post for steering and maneuvering over the golf course.

The principal objects of the present invention are to provide a motor-driven wheeled structure having a load-carrying section and a follower section connected together for relative pivotal movement about a vertical axis and a horizontal axis, which can be conveniently handled and maneuvered over rough terrain; to provide such a structure wherein the load-carrying section has a post with laterally spaced ground-engaging wheels with a lower portion on the post adapted to engage the ground when the handle is released and the drive is de-energized; to provide such a structure wherein the self-propelling unit is an attachment which may be applied to or detached from a two-wheeled cart having a post and handle for rocking the post about the wheels and steering the structure, and particularly such carts which may be folded for easy storage when detached; and to provide a self-propelled golf bag cart which is economical to manufacture, easily assembled and simply and easily maneuvered over rough terrain and conveniently handled by the golfer as he walks from place to place on the course.

Other objects and advantages of this invention will become apparent from the following description taken in connection with the accompanying drawings wherein are set forth by way of illustration and example certain embodiments of this invention.

FIG. 3 is a transverse sectional view through the power unit on the line 3—3, FIG. 4.

FIG. 4 is a longitudinal sectional view through the follower unit and the connector members for connecting to a cart.

FIG. 5 is a disassembled perspective view of the section connecting members.

Figure 6:
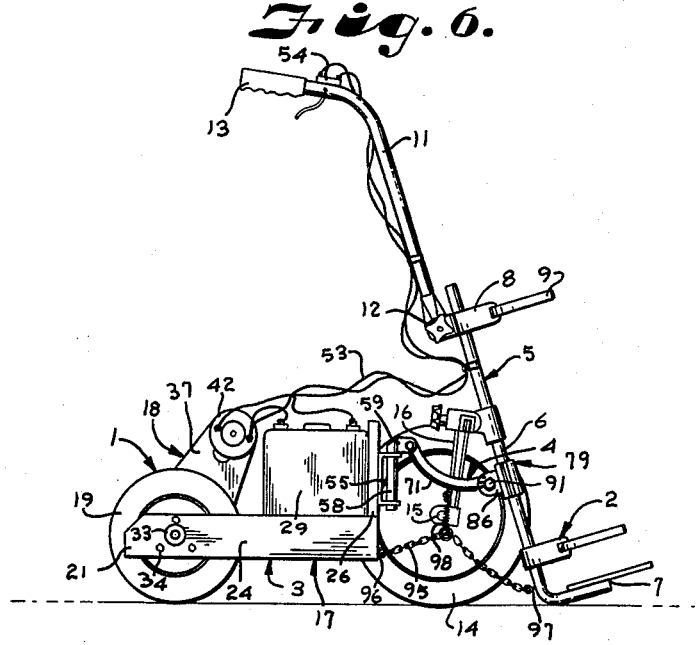
FIG. 6 is a side elevational view of a self-propelled golf bag cart with the portions in the position when stopped and released, the cover for the power unit being removed.
Figure 7:
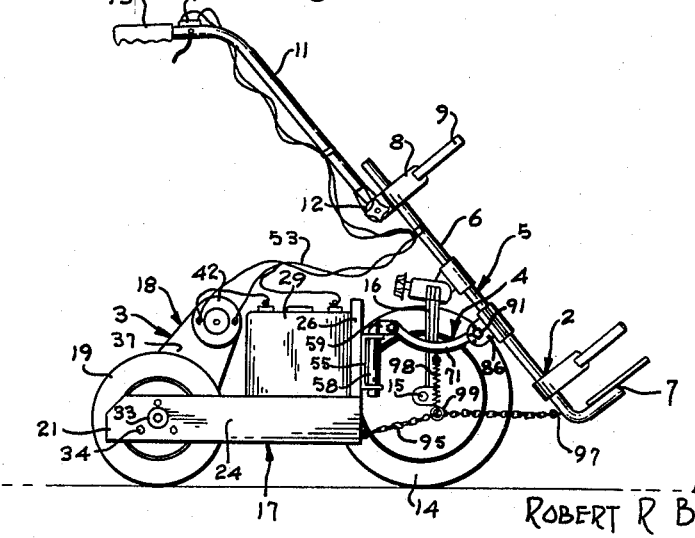
FIG. 7 is a side elevational view similar to FIG. 6 with the bag-carrying frame tilted to the traveling position.

Referring more in detail to the drawings:

The reference numeral 1 generally designates a self-propelled wheeled structure having a load-carrying section 2 and a follower traction section 3 with a connecting structure 4 therebetween for relative pivotal movement about a vertical axis and about a horizontal axis. In the illustrated structure, the load-carrying section is in the form of a golf bag carrying cart comprising essentially a frame 5 including a rigid upstanding post 6 having a forwardly projecting bag supporting bracket 7 at its lower end and saddles 8 spaced upwardly on the post with laterally extending members terminating in forwardly extending fingers 9 to engage sides of a golf bag 10 adapted to be carried thereon. A foldable handle 11 is connected as at 12 to the upper portion of the post and preferably has a grip 13 at its free end. The post 6 is supported by a pair of transversely spaced wheels 14 mounted on stub spindles 15 projecting from leg units 16 depending from the post at a rearward angle, the wheels being disposed so that when the post 6 is at a slight rearward slope as indicated in FIG. 6, the lower portion of the post or bag supporting bracket 7 will engage the ground and, when the post is rocked to a greater rearward slope, the lower end of the post or bracket 7 will clear the ground as illustrated in FIG. 7.

Figure 1:
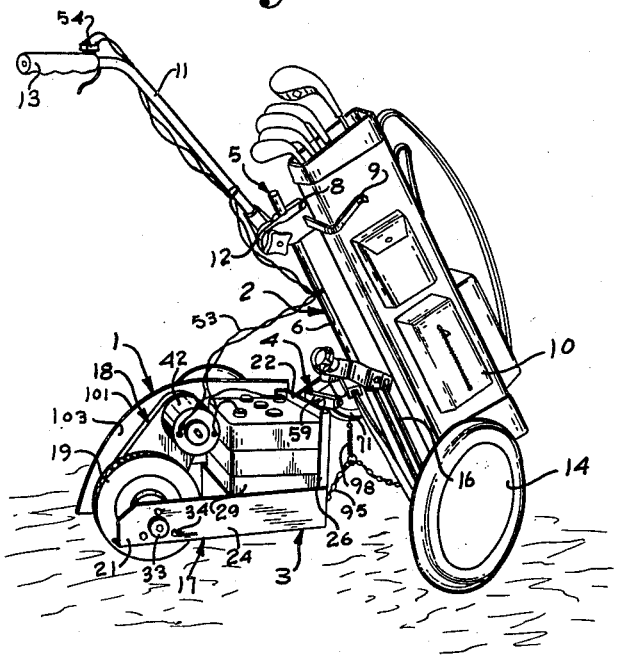
FIG. 1 is a perspective view of a self-propelled golf bag cart with portions of the cover broken away to illustrate the arrangement of the power unit.
Figure 2:
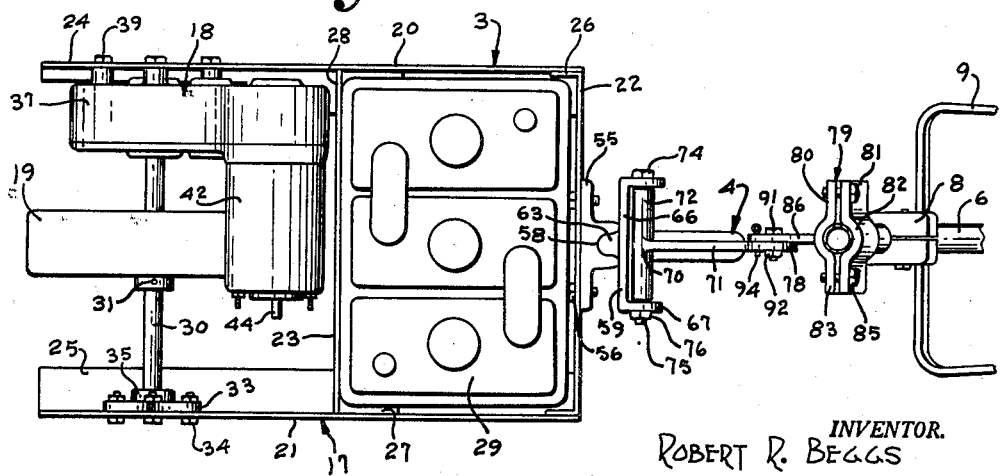
FIG. 2 is an enlarged fragmentary plan view of the follower traction unit and its connection to the post of the load-carrying section.

The follower traction section 3 includes a platform unit or frame 17 which carries a power unit 18 for driving a traction wheel 19 to provide propelling force for the structure. In the illustrated structure, the platform or frame 17 has laterally spaced longitudinally extending side rails 20 and 21 connected at their forward ends by an end member 22, and intermediate the ends by a transverse member 23, all suitably secured together as by welding to form a rigid structure. The side rails 20 and 21 are illustrated as being angle members each having upstanding flanges 24 and inturned flanges 25 at the lower edge of the upstanding flanges 24. The forward end member 22 is in the form of a plate with rearwardly extending side flanges 26 secured to the upstanding flanges 24 with the forward end or wall 22 and the flanges 26 extending substantially above the flanges 24, as illustrated in FIGS. 1 and 4. The transverse member 23 is in the form of an angle structure with a lower flange 27 resting on the flanges 25 and secured thereto with an upstanding flange 28 at the rear thereof. The flange 28 is spaced from the forward wall 22 to cooperate therewith and with the side rails 20 and 21 to define a receptacle for receiving a suitable battery 29 for supplying energy for the power unit as later described. The receptacle is slightly larger in area than the battery to facilitate the placing of the battery therein and removal therefrom, the weight of the battery normally holding it in place whereby it rests on and is supported by the flanges 25 and 27 between the flange 28 and forward wall 22. While the weight of the battery will normally hold it in place, it obviously may be anchored by any suitable conventional straps or clamps.

The traction wheel 19 is preferably mounted on an axle 30 and keyed thereto by a suitable key such as a pin 31 with one end of the axle rotatably mounted in a suitable bearing 32 carried in a bearing housing 33 secured by suitable fastening devices such as bolts 34 to the upstanding flange 24 of the rail 21. A collar 35 is fixed on the axle 30 and engaged with the bearing housing 33 to aid in reducing end play or axial movement of the axle. The other end 36 of the axle 30 extends into a housing 37 enclosing a speed reduction mechanism 38. In the illustrated structure, the housing 37 is suitably secured as by bolts 39 to the upright flange 24 of the rail 20, and the end portion 36 of the axle 30 is rotatably supported by bearings 40 and 41 carried by said housing. The speed reducing mechanism or transmission transmits power to the axle 30 from a motor 42 which, while it may be any suitable type of prime mover, in the illustrated structure is an electric motor secured as by fastening devices such as bolts 43 to the housing 37 with the motor shaft 44 extending into said housing and operatively connected with the speed reducing mechanism to effect rotation of the axle 30 and the traction wheel 19. In the particular speed reduction mechanism illustrated, a gear 45 is keyed to the motor shaft 44 and has a driving engagement with a gear 46 fixed to a shaft 47 carried by suitable bearings 47' in the housing 37. The gear 46 has driving engagement with the gear 48 fixed on an idler shaft 49 carried in bearings 50 in the housing 37. A small gear 51 is also fixed on the shaft or relative to the gear 48 and has driving engagement with a gear 52 suitably keyed to the axle 30, the gears all being of such relative size to provide the desired speed ratio between the motor shaft 44 and the axle 30 whereby the traction wheel 19 is driven at a suitable speed for comfortable walking. The motor 42 is connected in a suitable electric circuit with the battery 29 by conductors 53, the electric circuit including a switch 54 which is preferably mounted on the handle 11 adjacent the grip 13 whereby an operator can manipulate the switch while holding onto the grip 13 of the handle and operating the vehicle, as later described.

The connector structure 4 between the load-carrying section 2 and the follower section 3 is preferably adjustable to provide desired relative positions between the sections when the apparatus is moving or when at rest and, also, to provide for pivotal movement about both a vertical axis and a horizontal axis. In the structure illustrated, a bracket 55 is suitably secured as by fastening devices 56 such as screws on the upright forward wall 22 of the follower section. The bracket 55 has vertically spaced bearing members 57 adapted to receive and rotatably mount a spindle 58 of a yoke 59 for rotation about a vertical axis. The spindle 58 extends through bores 60 in the bearing portions 57 and is retained therein by a suitable fastening device or keeper 61 such as a cotter-pin extending through a hole 62 in the lower end of the spindle below the lower bearing portion, and the upper portion of the spindle has a forwardly extending lug 63 with a bottom face 64 adapted to rest on the upper face 65 of the upper bearing portion 57 to cooperate with the fastening device 61 to substantially eliminate axial movement of said spindle. The yoke 59 is carried on the lug 63 and includes oppositely outwardly extending arms 66 terminating in forwardly extending parallel ears 67 having aligned bores 68 for receiving a shank 69 to rotatably mount or pivotally connect one end 70 of an arm 71 to the yoke for pivotal movement about a horizontal axis. In the structure illustrated, the arm 71 has an elongate bearing member 72 at the end 70 of suitable length to extend between the ears 67 with the bore 73 aligned with the bores 68 whereby the shank 69 of a bolt 74 will extend therethrough and be secured in place. In the structure illustrated, the bolt has a threaded end 75 adapted to receive a nut 76 to secure the bolt in the yoke.

The arm 71 has its other end 78 suitably connected to the post 6 of the load-carrying section 2, and it is preferred that the connection be such that it provides for selective positioning and adjustment. In the structure illustrated, a two-piece clamp 79 is adapted to be engaged around the post 6, said clamp having mating sections 80 and 81 with elongated semi-cylindrical portions 82 and outwardly extending flanges 83 having aligned bores 84 to receive suitable fastening devices 85 such as bolts to secure the clamp onto the post 6 in desired elevated position. The clamp portion 80 has an ear 86 extending rearwardly therefrom with a side face 87 adapted to be engaged by a side face 88 of the end portion 78 of the arm 71 which has a bore 89 adapted to register with a bore 90 in the ear 86 to receive a clamping screw 91 with a nut 92 threaded thereon to form an adjustment of the angular relation between the arm 71 and the post 6 with the screw and nut clamping the ear 86 and end portion 78 together in selected adjusted position. The ear 86 and arm portion 78 have a plurality of registrable holes 93 to receive a keeper pin 94 to cooperate with the screw 91 and hold the portions in selected position. The arm 71 is preferably curved to cooperate with the angular adjustment between the arm and post to facilitate suitable locating of the clamp member 79 on the post and, when located, the angular relationship of the arm 71 and the post 6 may be adjusted whereby the load-carrying frame or post 6 may be tilted, as illustrated in FIG. 7, or arranged at rest, as illustrated in FIG. 6, and the platform 17 remains substantially horizontal during such movements.

The weight of golf equipment on the load-carrying section will tend to swing the post to a rest position as illustrated in FIG. 6, however, it is preferred that it be biased to swing the lower end toward the ground and, also, that the tilting movement be limited to prevent it being folded back onto the follower section. In the illustrated structure, a flexible member such as a chain 95 has one end 96 connected to the platform 17 and the other connected as at 97 to the post 6 adjacent its lower end and a resilient member such as a spring 98 has a sliding connection as by a ring 99 with the chain 95 and its other end suitably connected as at 100 to the arm 71 whereby the chain limits the tilting action of the post and the spring biases the post toward the position illustrated in FIG. 6.

A housing or cover 101 is mounted on the platform or frame 17 to extend over the battery and motor to enclose same and also provide a neat appearance. The cover has a top wall 102 and depending side walls 103 with the side walls engaging over the flanges 24 of the side rails. The forward end of the cover engages over the end wall 22 and is notched to provide an edge 104 to engage the bracket 55 whereby there are shoulders to position the cover on the platform or frame 17. Suitable fastening devices such as screws 105 may be used to secure the housing in place.

With a structure constructed and assembled as illustrated and described and a bag 10 on the load-carrying section, an operator grasps the grip 13 moving the handle downwardly to tilt the post 6 to a position as illustrated in FIG. 7. Then, by actuating the switch 54 to complete the circuit from the battery 29 to the motor 42, the motor is energized and through the speed reduction transmission drives the axle 30 and the traction wheel 19. The rotation of the traction wheel 19 causes the follower section to push the load-carrying section to propel same over the terrain. The operator holding the grip 13 steers the apparatus by swinging the handle to one side or the other turning the load-carrying section to head same in a desired direction, and the follower section trails in a caster-like action due to the relative pivoting of the sections about the vertical axis of the spindle 58. Also, in moving over rough terrain, the operator can substantially maintain the same level of the grip 13 of the handle 11 as the relative angularity between the post 6 and the follower section may alter to accommodate variations in terrain due to the pivotal movement about the horizontal axis of the shank 69. The action of the spring 98 tending to bias the lower end of the post 6 toward the ground, allows the operator to always maintain a desired force on the handle, and such spring action tends to provide a cushion to reduce any shock or vibration that might otherwise result from passing over rough terrain. When moving down inclines, the operator releases the switch 54 to thereby interrupt the circuit to the motor and then the rotation of the traction wheel 19 and the resultant drag of the speed reduction mechanism forms a brake, retarding tendency of the apparatus to roll down the incline whereby the operator can cause same to move at a desired rate with little effort of either pushing or slightly holding back on the structure depending upon the grade of the incline. When it is desired to stop on a level or incline, the operator releases the switch 54 causing same to interrupt the circuit to the motor and then allows the handle 11 to raise whereby the post 6 swings downwardly and the lower end engages the ground and thereby tends to hold the structure in a desired position at rest. If the follower section is used as an attachment to a golf bag cart, the clamp structure 79 may be disconnected from the post 6 and the golf bag cart used for manual propelling in an ordinary manner. Also, the follower section may be used with various bag carts as the connections and disconnections may be easily and quickly accomplished. The housing or cover 101 may be easily removed and the battery charged in place or the battery is easily removed and replaced as desired. The structure is light, easily handled, and capable of long periods of operation for traveling substantial distances on one battery charge as, for example, multiple rounds of golf.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A self-propelled wheeled structure comprising, a load-carrying section having a frame with a post and laterally spaced ground-engaging wheels carried thereon, said frame being adapted to be rocked about said wheels and having a lower end adapted to engage the ground in one position, a follower traction section, said sections being connected together for relative pivotal movement about a vertical axis and about a horizontal axis, a handle on said post and extending therefrom over the follower section to tilt said frame on said ground-engaging wheels to raise the lower end of the frame from the ground and to steer said load-carrying section, a traction wheel on the follower section spaced rearwardly of the pivotal connections of the sections, a motor on said follower section, speed reduction means operatively connecting the motor and the traction wheel to drive said traction wheel, means controlling operation of the motor to drive said traction wheel, and elongate flexible means including a resilient member having opposite ends connected to the load-carrying section and traction section respectively in vertically spaced relation to the horizontal axis about which said sections pivot for limiting tilting of said frame and urging the lower end of the frame toward the ground.

2. A self-propelled wheeled structure comprising, a load-carrying section having a frame and laterally spaced ground-engaging wheels carried thereon, said frame being tiltable about said wheels and having a lower end adapted to engage the ground, a follower traction section having a forward end, a yoke on the forward end of said follower traction section and mounted for relative pivotal movement about a vertical axis, an arm mounted on said yoke for relative pivotal movement about a horizontal axis with said arm extending forwardly therefrom, means adjustably connecting the other end of said arm to said frame of the load-carrying section, means selectively varying the angular relation of said arm and frame in a vertical plane to adjust the elevation of said yoke from the ground, a traction wheel on the follower section spaced rearwardly from the forward end thereof, a motor on said follower section, gear reduction means operatively connecting the motor and traction wheel to drive said traction wheel in response to operation of said motor, and a handle on said frame and extending therefrom over the follower section for tilting the frame of the load-carrying section to raise the lower end thereof from the ground and to steer the load-carrying section.

3. A self-propelled wheeled structure comprising, a load-carrying section having a frame and laterally spaced ground-engaging wheels carried thereon, said frame being tiltable about said wheels and having a lower end adapted to engage the ground, a follower traction section having a forward end, a yoke on the forward end of said follower traction section and mounted for relative pivotal movement about a vertical axis, an arm mounted on said yoke for relative pivotal movement about a horizontal axis with said arm extending forwardly therefrom, means adjustably connecting the other end of said arm to said frame of the load-carrying section, means selectively varying the angular relation of the arm and frame in a vertical plane to adjust the elevation of said yoke from the ground, a traction wheel on the follower section spaced rearwardly from the forward end thereof, a motor on said follower section, gear reduction means operatively connecting the motor and traction wheel to drive said traction wheel in response to operation of said motor, a battery supported on said follower section, a handle on said frame and extending therefrom over the follower section for tilting the frame of the load-carrying section to raise the lower end thereof from the ground and to steer the load-carrying section, a control switch mounted on said handle, and an electric circuit including said switch electrically connecting said battery and motor for energizing the motor to drive said traction wheel.

4. A self-propelled wheeled structure comprising, a load-carrying section having a frame with a post and laterally spaced ground-engaging wheels carried thereon, said frame being tiltable about said wheels and having a lower end adapted to engage the ground, a follower traction section having a forward end, a yoke on the forward end of said follower traction section and mounted for relative pivotal movement about a vertical axis, an arm mounted on said yoke for relative pivotal movement about a horizontal axis with said arm extending forwardly therefrom, means adjustably connecting the other end of said arm to said post of the load-carrying section, means selectively varying the angular relation of said arm and post in a vertical plane, a traction wheel on the follower section spaced rearwardly from the forward end thereof, a motor on said follower section, gear reduction means operatively connecting the motor and traction wheel to drive said traction wheel in response to operation of said motor, a battery supported on said follower section, a handle on said post and extending therefrom over the follower section for tilting the frame of the load-carrying section to raise the lower end thereof from the ground and to steer the load-carrying section, a control switch mounted on said handle, an electric circuit including said switch, electrically connecting said battery and motor for energizing the motor to drive said traction wheel, flexible means connecting lower portions of said sections to limit tilting of said frame, and resilient means connected to said flexible connecting means to urge the lower end of the frame toward the ground.

5. A self-propelled attachment adapted for use with and detachable connection to a golf bag cart having an upstanding post at the back and a pair of transversely spaced supporting wheels about which the post may rock in a vertical plane with means on said post adapted to engage a golf bag to be carried and a lower portion on said post adapted to engage the ground in one position and a handle member on said post and extending rearwardly therefrom for rocking said post to raise said lower portion from the ground and to steer the cart, the attachment comprising a platform unit, having a forward end, an axle on said platform rearwardly of the forward end, a traction wheel carried by said axle, a motor on said platform, speed reduction means operatively connecting the motor and traction wheel to drive said traction wheel, an arm, a detachable connecting and clamping member on one end of said arm for attachment to said post, means at the other end of said arm connecting same to the forward end of the platform unit for relative pivotal movement about a vertical axis and about a horizontal axis, and elongate flexible means having ends connected to the platform unit and post in vertically spaced relation to said horizontal axis to limit said rocking movement of the post.

6. A self-propelled attachment adapted for use with and detachable connection to a golf bag cart having an upstanding post at the back and a pair of transversely spaced supporting wheels about which the post may rock in a vertical plane with means on said post adapted to engage a golf bag to be carried and a lower portion on said post adapted to engage the ground in one position and a handle member on said post and extending rearwardly therefrom for rocking said post to raise said lower portion from the ground and to steer the cart, the attachment comprising a platform unit, having a forward end, an axle on said platform rearwardly of the forward end, a traction wheel carried by said axle, a motor on said platform, speed reduction means operatively connecting the motor and traction wheel to drive said traction wheel, a battery supported on said platform unit forwardly of the traction wheel, a control switch, an electric circuit including said switch, electrically connecting said battery and motor for energizing said motor to drive the traction wheel, an arm, a detachable connecting and clamping member on one end of said arm for attachment to said post and selective adjustment of the angular relation of the arm and post in a vertical plane, and means at the other end of said arm connecting same to the forward end of the platform unit for relative pivotal movement about a vertical axis and about a horizontal axis.

7. A self-propelled attachment adapted for use with and detachable connection to a golf bag cart having an upstanding post at the back and a pair of transversely spaced supporting wheels about which the post may rock in a vertical plane with means on said post adapted to engage a golf bag to be carried and a lower portion on said post adapted to engage the ground in one position and a handle member on said post and extending rearwardly therefrom for rocking said post to raise said lower portion from the ground and to steer the cart, the attachment comprising a platform unit, having a forward end, an axle on said platform rearwardly of the forward end, a traction wheel carried by said axle, a motor on said platform, speed reduction means operatively connecting the motor and traction wheel to drive said traction wheel, a spindle, means pivotally mounting said spindle on the forward end of the platform unit for pivotal movement about a vertical axis, an arm, means pivotally mounting one end of said arm on said spindle for pivotal movement about a horizontal axis, clamp means on the other end of said arm for detachable connection to the cart post, and means adjacent said clamp means for varying the angular relationship of the arm and post in a vertical plane to adjust the elevation of the forward end of the platform from the ground.

8. A self-propelled attachment adapted for use with and detachable connection to a golf bag cart having an upstanding post at the back and a pair of transversely spaced supporting wheels about which the post may rock in a vertical plane with means on said post adapted to engage a golf bag to be carried and a lower portion on said post adapted to engage the ground in one position and a handle member on said post and extending rearwardly therefrom for rocking said post to raise said lower portion from the ground and then on operation attachment comprising a platform unit, having a forward end, an axle on said platform rearwardly of the forward end, a traction wheel carried by said axle, a motor on said platform, speed reduction means operatively connecting the motor and traction wheel to drive said traction wheel, a battery supported on said platform unit forwardly of the traction wheel, a control switch, an electric circuit including said control switch, electrically connecting said battery and motor for energizing said motor to drive the traction wheel, a spindle, means pivotally mounting said spindle on the forward end of the platform unit for pivotal movement about a vertical axis, an arm, means pivotally mounting one end of said arm on said spindle for pivotal movement about a horizontal axis, means on the other end of said arm for detachable connection to the cart post, and means on said platform unit and connected to said arm for biasing the lower portion of the car toward the ground whereby force must be applied to the handle to tilt the cart and raise said lower portion from the ground and to steer the cart, the of the motor the cart will be propelled and the handle swung laterally to steer the cart.

References Cited in the file of this patent

UNITED STATES PATENTS

| | | |
|---|---|---|
| 1,213,260 | Rendle | Jan. 23, 1917 |
| 2,552,846 | Dinkins | May 15, 1951 |
| 2,706,008 | Voight | Apr. 12, 1955 |
| 2,741,490 | Chamberlin et al. | Apr. 10, 1956 |
| 2,962,106 | Burnside et al. | Nov. 29, 1960 |